March 26, 1963     T. E. FORD ET AL     3,082,923
APPARATUS FOR CUTTING SHEET MATERIAL
Filed Nov. 20, 1959     2 Sheets-Sheet 1

INVENTOR
THOMAS E. FORD
NORMAN S. THOMAS, JR.

BY
ATTORNEYS

March 26, 1963   T. E. FORD ET AL   3,082,923
APPARATUS FOR CUTTING SHEET MATERIAL
Filed Nov. 20, 1959   2 Sheets-Sheet 2

INVENTOR
THOMAS E. FORD
NORMAN S. THOMAS, JR.

BY Cushman Darby Cushman
ATTORNEYS

United States Patent Office 3,082,923
Patented Mar. 26, 1963

3,082,923
APPARATUS FOR CUTTING SHEET MATERIAL
Thomas E. Ford and Norman S. Thomas, Jr., Arlington, Mass., assignors to W. R. Grace & Co., Cambridge, Mass., a corporation of Connecticut
Filed Nov. 20, 1959, Ser. No. 854,484
9 Claims. (Cl. 225—104)

The present invention relates to an apparatus for cutting sheet material and, more particularly, to a new and improved apparatus for cutting the web of a roll of highly oriented polyethylene film having special inherent tear properties into sheets of desired lengths.

Heretofore, apparatus have been made for severing sheets of thin material from a web issued by a continuous roll of the material. Such apparatus have utilized a knife for cutting transversely across the web after the web has been fed a desired length, the knife cooperating with a second cutting element whereby the severance of the material results from a shearing action across the entire width of the material. In the cutting of thin film material, such as a polyethylene film which has been biaxially oriented, it has been found the material has an inherent property of propagating a tear in a straight line once the tear is initiated. One example of an irradiated biaxially oriented polyethylene film is Alathon 14 (polyethylene, molecular weight about 20,000, density 0.916) which has been irradiated to an extent of 12 megarad and then stretched 350° longitudinally and 350° laterally. This film has a shrink energy of 250 p.s.i. at 96° C. Other suitable irradiated biaxially oriented polyethylene film which has been irradiated to an extent of 2 to 100 megarad, preferably 6 to 20 megarad also has the inherent property of propagating a tear in a straight line once the tear is initiated. While the present invention is preferably for use with such films having the inherent property of propagating a tear in a straight line when the tear has been initiated, it will be understood that it is within the scope of the present invention to use the apparatus in cutting materials other than irradiated biaxially oriented polyethylene.

An object of the present invention is to provide an improved apparatus for severing a sheet of material from a web of a continuous roll of the material, the apparatus being capable of operation with a minimum of effort, time and costs on the part of the operator.

Another object of the present invention is to provide an improved type of apparatus for cutting or severing material along a straight line transverse to the length of the material.

Still another object of the present invention is to provide an improved cutting apparatus whereby the material may be issued from a roll and easily positioned between the cutting elements, the proper tension being maintained on the roll as the material is being issued.

A further object of the present invention is to provide an improved type of cutting apparatus which will automatically sever a sheet material from a web of material issuing from a roll, the material being placed under increasing tension as the severing operation is being accomplished.

A still further object of the present invention is to provide a cutting apparatus for cutting sheets of material from a web issuing from a roll of the material, the apparatus including means to increase the safety of operation.

A further object of the present invention is to provide an improved cutting apparatus for cutting a thin film of material, the apparatus including means to maintain control of the film during and after the cut is made so that the severed edge of the material can not be damaged.

These and other objects and advantages of the present invention will be more apparent from the following specification, claims and drawings in which:

Figure 1:
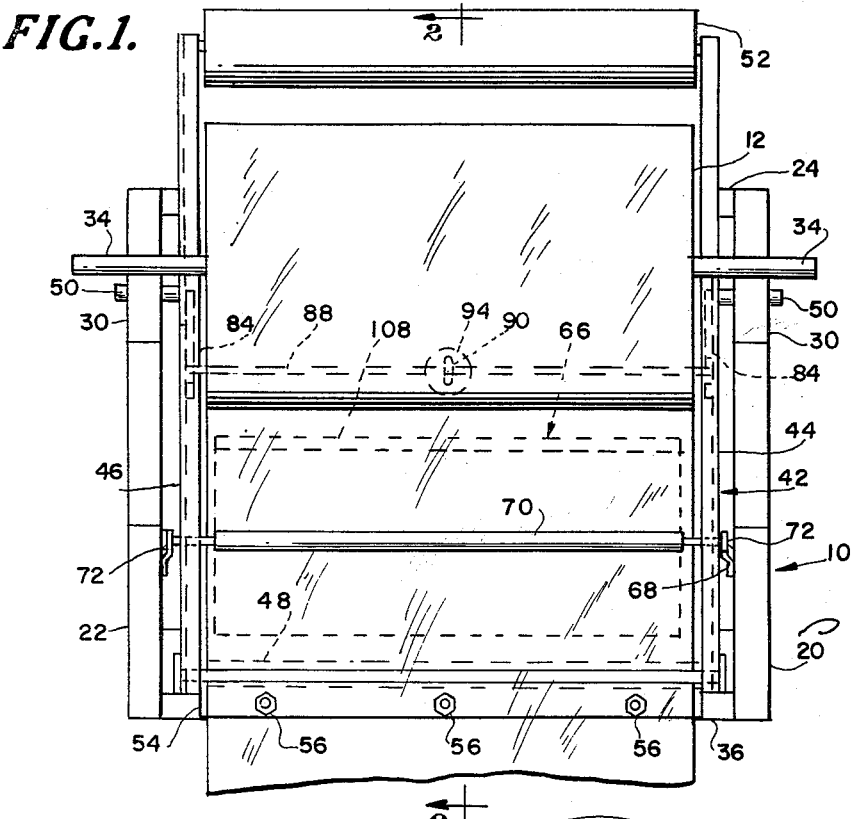
FIGURE 1 is a top plan view of the apparatus of the present invention.

Referring now to the drawings wherein like character or reference numerals represent like or similar parts, the cutting apparatus of the present invention includes a stationary frame structure generally designated by the numeral 10, a roll of film material 12 to be cut and cooperating cutting elements 14 and 16. The cutting element 16, which is a knife blade, is fixedly supported in the frame structure 10 and extends parallel to the axis of the roll 12. The movable cutting element 14 is a cutting bar having a slot 18 which cooperates with the blade 16. By utilizing a scalloped-shaped blade, the material to be cut is first pierced by the pointed edges of the blade and then the cut is increasingly propagated on a straight line and utilizing the inherent property of the material of roll 12. In effect, this gives a guillotine type of cut rather than a straight shearing action which results from cutting elements engaging the web across its entire surface simultaneously.

In more detail, the frame structure 10 includes a pair of spaced side members 20 and 22 supported in a vertical position by any number of suitable cross members 24 and 26. The front of the frame structure may be covered by a piece of sheet material as indicated at 28. Side members 20 and 22 are provided with upstanding portions 30 which are similarly notched as indicated at 32 for removably receiving and rotatably supporting the opposite ends of an arbor 34 of the roll of material 12. A box-shaped member 36 extending transversely between and fixedly secured to the side members 20 and 22 provides a support for the blade of the fixed cutting element 16. The box-shaped member 36 is provided with a slot 38 extending transversely of the frame structure 10 and parallel to the axis of the roll 12. The upper slotted wall of box-shaped member 26 defines a plate 40 for supporting the material to be severed immediately adjacent the point of severance and because it is necessary for the movable cutting element 14 to extend through the slot to cooperate with the fixed cutting element 16, the material already has the necessary tension on both sides of the cutting elements.

A yoke-shaped member 42 provides a means for supporting the movable cutting bar 14. More specifically, the yoke-shaped member includes a pair of side members 44 and 46 connected together by a cross bar 48. The side members 44 and 46 are provided with stub shafts 50 which are adapted to be received in suitable holes provided in the side members 20 and 22. As is now evident, the yoke-shaped member 42 pivots on an axis parallel to the axis of the roll 12. A counterweight 52 is provided on the opposite end of the side members 44 and 46 so as to urge the yoke-shaped member 42 in a clockwise direction as viewed in FIGURE 2 whereby the cutter element 14 is moved away from the cutter element 16. Cutter element 14 is supported on the lower surface of cross member 48 in any suitable manner.

Figure 2:
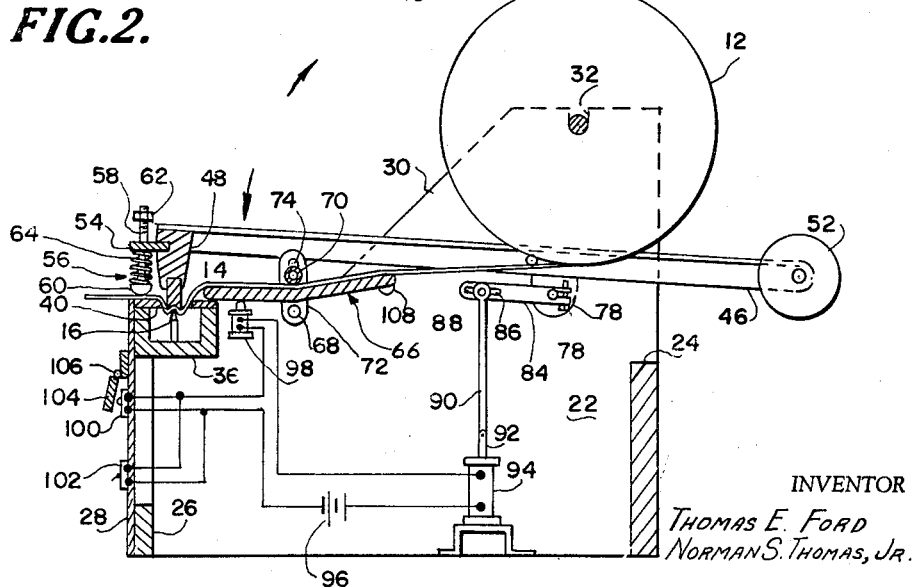
FIGURE 2 is a sectional view partly in elevation and taken approximately on the line 2—2 of FIGURE 1, the apparatus being shown in cutting position.
Figure 3:
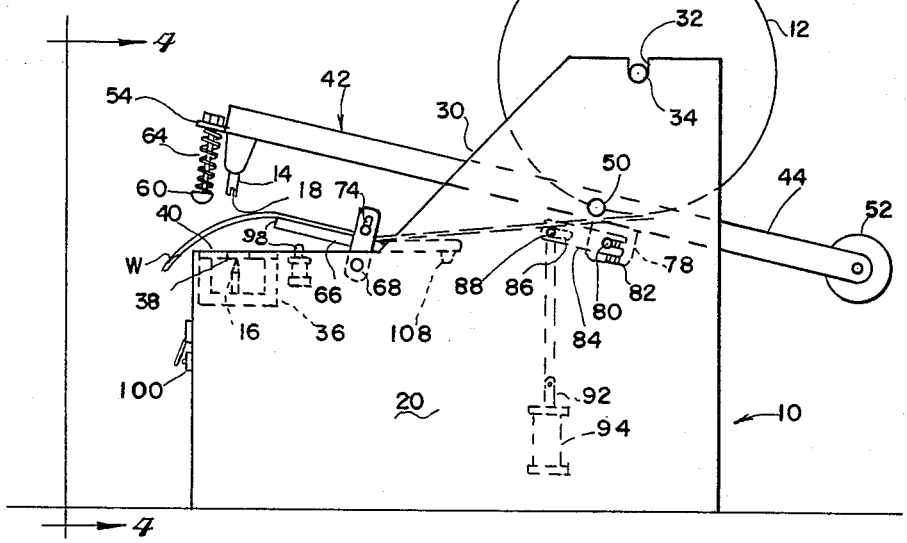
FIGURE 3 is a side elevational view of the apparatus shown in FIGURE 1 but with the cutting elements positioned in the inoperative position.
Figure 4:
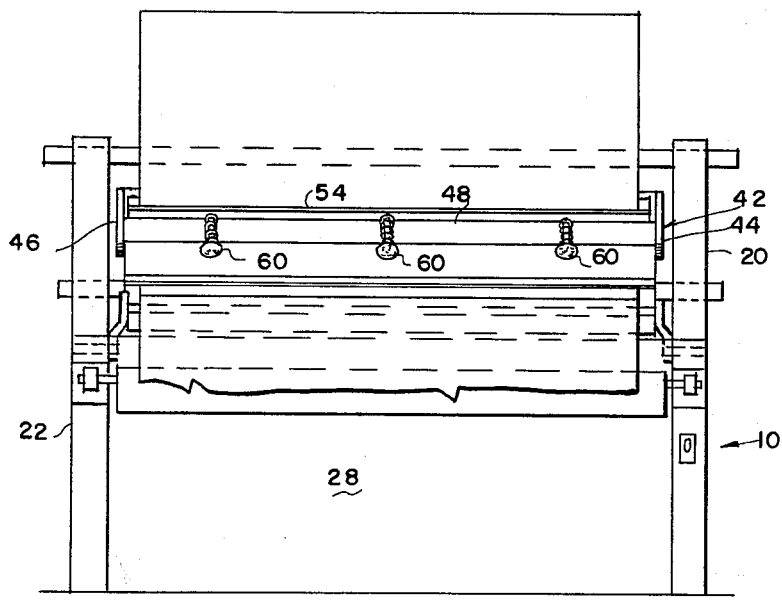
FIGURE 4 is a front elevational view of the apparatus shown in FIGURE 3.

Extending outwardly from the front of the cross member 48 is a plate member 54, the plate member 54 supporting a plurality of yieldably mounted gripper members 56. Each gripper member 56 includes a bolt element 58 having a rubber head portion 60 adapted to engage the material when the yoke-shaped structure is moved counterclockwise as shown in FIGURE 2. The other end of the bolt element 58 is provided with a nut 62 and a compression spring 64 is supported intermediate the plate member 54 and the head 60 so as to normally urge the head to a downward position as shown in FIGURE 3.

A tilt table 66 is pivotally mounted to the side members 20 and 22 respectively, as indicated at 68 so that it can tilt oscillate on an axis parallel to the axis of the roll 12. The tilt table 66 is provided with a dished-shaped upper surface in section through a plane transverse to its pivotal axis. Mounted above the dished-shaped upper surface of the tilt table 66 is a roller 70 carried between the brackets 72 which also pivotally mount the table to the parallel side members 44 and 46. Each bracket 72 is provided with a slot 74 in which the pintles of the roller 70 can move so as to vary the clearance between the roller and the surface of the table 66.

Yoke member 42 is provided on each of its side members 44 and 46 with a downwardly depending bracket 78. Each bracket 78 has an inwardly extending stub shaft 80. Fixedly clamped to the stub shaft 80 by means of the lock nut assembly 82 is a lever arm 84 having an elongated slot 86 at its outer end. A rod 88 extends transversely of the frame structure 10 and is adapted to have its ends ride in the respective slots 86 of each of the lever arms 84. A linkage 90 is attached at one end to the center portion of the rod 88, the other end of the linkage being suitably connected to an armature 92 of a solenoid 94 carried in the frame structure 10.

The circuit for energizing the solenoid 94 includes a source of power 96, a microswitch 98 suitably positioned on the frame structure 10 for engagement by the tilt table 66 and a knee actuated microswitch 100 in series with the microswitch 98. Both the knee actuated microswitch 100 and the tilt table actuated microswitch 98 are normally open switches. A manually operated throw switch 102 is provided in parallel with the knee actuated microswitch 100, the throw switch 102 being opened but capable of being closed if it is desired to render the knee actuated switch 100 inactive.

In order that the microswitch 100 can be actuated, a knee bar 104 suitably pivoted as indicated at 106 to the frame structure 10 is provided. A slight pressure of the operator's knee against the knee bar 104 causes the bar to engage and to close the microswitch 100. When both the microswitch 100 and the microswitch 98 are closed, the circuit is complete, thus causing the solenoid 94 to be energized. When the solenoid is energized, it causes the yoke-shaped member 42 to move from a position shown in FIGURE 3 to the cutting position shown in FIGURE 2. Once the material has been severed by the cooperating cutting elements 14 and 16, the tilt table 66, which is provided with a counterweight at 108, moves in a clockwise direction from the position shown in FIGURE 2 to the position as shown in FIGURE 3 whereby the microswitch 98 is opened and the solenoid de-energized. As soon as the solenoid is de-energized, the counterweight 52 causes the yoke-shaped member 42 carrying the cutter element to move in a clockwise direction to the position shown in FIGURE 3.

The operation of the apparatus of the present invention may be briefly described as follows.

When the apparatus is in the position shown in FIGURE 3, the web W issuing from the roll 12 may be easily grasped by hand and pulled between the cutter elements 14 and 16 until a desired length is obtained. The roller 70 provides sufficient tension on the web being issued from the roll 12 as its weight is borne by the web due to its particular mounting on the tilt table. In other words, the operator need not be concerned by the inertia of the roll causing more of the web to unroll than is desired. Once the desired amount of web has been unwound from the roll 12 and it is desired to cut the web transversely thereof, the operator need merely to pull the web downwardly so that the tilt table 66 pivots about 68 from the position shown in FIGURE 3 to the position shown in FIGURE 2. The forward, underneath surface of the tilt table will engage and close the microswitch 98. By mere pressure of the operator's knee upon the knee bar 104, the microswitch 100 is closed, thus, energizing the solenoid 94 to cause its armature to move downwardly to the position as shown in FIGURE 2 where it has through the linkage 90 caused the yoke-shaped member 42 to move counterclockwise to a cutting position.

Prior to the cutting bar 14 severing the web W, the grippers 56 will engage the web so that when the cutting action is taking place there can be no loss of control of the severed edge of the web outwardly of the cutting elements 14 and 16. The roller 70 and the particular configuration of the tilt table 66 provides sufficient tension inwardly of the cutting elements so that during the cutting operation there is always tension on the material as it is being severed.

Once the material has been severed, the counterweight 108 on the tilt table 66 causes it to pivot clockwise about its pivot 68 as viewed in FIGURE 2 and this breaks the circuit to the solenoid 94, de-energizing the same whereby the counterweight 52 can take over and move the cutting element 14 of the yoke-shaped member 42 to the inoperative position.

If it is desired to have the movable cutting element 14 actuated as soon as the tilt table 66 is moved to the position of FIGURE 2, it is merely necessary to throw the auxiliary switch 102 to a position whereby the microswitch 100 is rendered ineffective. However, the preferable form of the invention is to provide the microswitch 100 in series with the microswitch 98 as an added safeguard so that the operator will not be in danger by having his hands between the cutting elements if the switch 98 is inadvertently actuated when the material is being pulled between the cutting elements and across the tilt table.

The apparatus heretofore described is susceptible to some modifications, adjustments and changes without departing from the principle and spirit of the invention. For this reason, the terminology of the specification is for the purpose of description and not of limitation, the scope of the invention being defined in the claims.

What is claimed is:

1. In an apparatus for cutting a web of sheet material as the sheet material is fed from a roll: a stationary frame structure for rotatably supporting the roll of sheet material, a fixed plate member carried by said frame structure in spaced relationship to the roll for receiving the web of material to be severed as it is issued from the roll, said plate member having a slot therein extending transversely of the web of material, a fixed cutter element supported by said frame structure and mounted within said slot, a reciprocating cutter element cooperating with said fixed cutter element to sever the web, a table member interposed between the roll and said plate member, means to pivotally mount said table member on said frame structure for pivotal motion on an axis parallel to the axis of the roll, said table member having an upper surface for receiving the web as it issues from the roll and being pivotable from a first position where the edge of the web may be grasped and pulled between the cutter elements with tension thereon to a second position, and means of normally urging said table member to said first position, said last mentioned means being effective to maintain tension on the web as the web is being pulled through the cutter elements and is severed by the same and effective to return the table member to said first position after said cutter elements have severed the web.

2. An apparatus of the character described in claim 1 including means carried by said reciprocable cutter elements for cooperating with said plate member for engaging the web and controlling the same as the web is being cut by said cutting elements.

3. An apparatus of the character described in claim 2 wherein said means includes a plurality of yieldably mounted gripper elements positioned outwardly of said reciprocable cutter element, said gripper elements being adapted to engage the web transversely of the same just prior to the cutting action of said cutter elements.

4. In an apparatus for cutting a web of sheet material as the web is fed from a roll: a frame structure, a roll of sheet material rotatably mounted on said frame structure, a plate member carried by said frame structure in spaced relationship to the roll and having a slot therein extending parallel to the axis of the roll, a fixed cutter element supported by said frame structure and mounted within said slot, a yoke member pivotally mounted to said frame structure on an axis parallel to the axis of said roll and having a cutter element for oscillation thereon to cooperate with said fixed cutter element, a table member interposed between said roll and said plate member, means to pivotally mount said table member on said frame structure for pivotal movement on an axis parallel to the axis of the roll, said table member having its upper surface for receiving the web as it issues from the roll and pivotable from a first position where the edge of the web may be grasped and the web may be pulled between said cutter elements with tension thereon to a second position, means normally urging said table member to said first position, said last mentioned means being effective to maintain tension on the web as the web is being pulled through the cutter elements and is severed by the same and effective to return the table member to said first position, and means operative by movement of said table member to said second position to cause movement of said yoke and its cutter elements to a cutting position.

5. An apparatus of the character described in claim 4 wherein last-mentioned means includes a solenoid operatively connected to said yoke and switch means operable by movement of said table member to said second position whereby said solenoid is energized.

6. An apparatus of the character described in claim 5 including switch means carried in series with said solenoid and said first-mentioned switch means, said second switch means being operable by an operator of the apparatus.

7. An apparatus of the character described in claim 4 wherein said yoke member is provided with a counterweight for normally urging said yoke member and its cutter element away from said fixed cutter element.

8. An apparatus of the character described in claim 4 wherein said table member supports a rod extending transversely across the upper surface thereof, the web from the roll passing between said rod and the upper surface of said table member.

9. An apparatus of the character described in claim 4 wherein the upper surface of said table member is dish-shaped in section through a plane transverse its pivotal axis.

References Cited in the file of this patent

UNITED STATES PATENTS

| | | |
|---|---|---|
| 978,535 | Armstrong | Dec. 13, 1910 |
| 1,299,087 | Winterhalter | Apr. 1, 1919 |
| 1,902,604 | Winter | Mar. 21, 1933 |
| 2,114,440 | Demetrakopoulos | Apr. 19, 1938 |
| 2,543,596 | Penn | Feb. 27, 1951 |
| 2,741,979 | Arcus | Apr. 17, 1956 |
| 2,871,939 | Close | Feb. 3, 1959 |